Patented Apr. 16, 1940

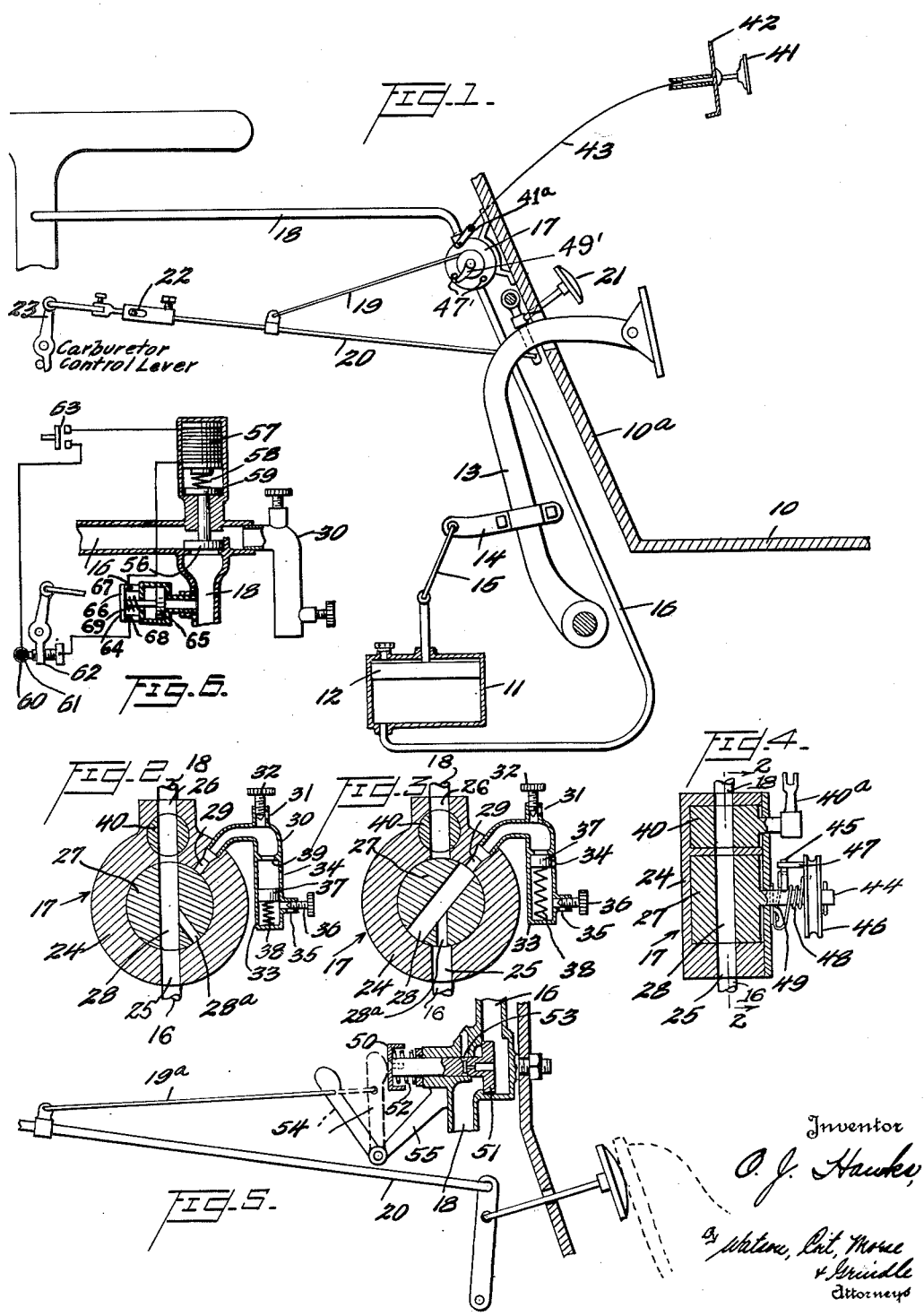

2,197,469

UNITED STATES PATENT OFFICE 2,197,469

AUTOMATIC CLUTCH

Otis J. Hawks, Norfolk, Va., assignor to Bragg-Kliesrath Corporation, South Bend, Ind., a corporation of New York Application September 15, 1931, Serial No. 562,951
Renewed September 20, 1933

3 Claims. (Cl. 192—.01)

This invention relates to automatically controlled clutches in motor vehicles and more specifically to such clutches as are disengaged through the action of a servo-motor, i. e. a motor operated by fluid pressure, said pressure being preferably obtained from the intake manifold of the vehicle engine.

Automatic clutching devices of this general type are known but are not completely successful for many reasons, some of which will be hereinafter pointed out. The object of the present invention is to overcome the objectionable operating features of these prior devices to obtain both automatic clutching and free wheeling in a highly satisfactory manner by adding certain apparatus elements and improving upon the mechanics of the apparatus elements formerly employed.

In the operation of motor vehicles equipped with devices of the nature described, the engaging and disengaging of the clutch is controlled by movement of the accelerator or throttle lever, the same being connected to a valve in a conduit leading from the manifold to the servo-motor.

In the operation of the prior devices the valve and connection to the accelerator pedal are so arranged that when the latter is in its closed or idling position, the suction of the intake manifold operating through the servo-motor draws and holds the clutch in its disengaged position with the result that the clutch becomes disengaged whenever the engine is permitted to idle, and cannot again be engaged until the accelerator is depressed and the speed of the engine increased.

In operating vehicles it is often desirable, particularly when traveling at high speeds, to reduce the speed by idling the engine and permitting the clutch to remain engaged. In vehicles equipped with the prior devices, the clutch becomes disengaged immediately when pressure on the pedal is released, and hence the braking effect of the engine cannot be had. Some prior devices, however, do have a manually operated control for completely cutting out the automatic clutch device, but these controls are so inconvenient to operate that the driver of the vehicle will not often take the trouble to make use of the same. The inability to use the engine handily for this purpose requires frequent use of the brakes and thus subjects the braking mechanism to unnecessary wear. Also, when traveling, particularly on winding roads, the operator will shift his foot from the accelerator pedal to the brake pedal to reduce the speed and back again to the accelerator pedal at all too frequent intervals.

One of the principal objects of the present invention is to provide a mechanism which overcomes this objectional feature. The same is accomplished by so connecting the accelerator pedal with the throttle valve and with the valve controlling the servo-motor and hence the clutch, that a slight movement, preferably about a quarter of an inch, of the accelerator pedal in what normally is its closed or idling position has no effect upon the throttle valve but serves to operate the control valve.

In the operation of vehicles equipped with the device of the instant invention, the braking effect of the engine may be had merely by releasing pressure on the accelerator pedal to a point where the same is elevated to about a quarter of an inch from its completely released position.

Another object of the present invention is to provide a valve for use in the fluid pressure line which is efficient in its operation and which is durable in its construction.

In many motor vehicles the clutch pedal is so arranged that the clutch does not become engaged until the pedal has moved from its completely pressed position up to within two inches or more from its released position. When such vehicles are equipped with the prior automatic clutching devices of the nature described, the clutch pedal moves at a uniform slow speed from its pressed to its released position, resulting in an unnecessary delay in effecting its engagement.

A further object of the present invention is to provide a breather valve for use in conjunction with the valve controlling the fluid pressure whereby the initial movement of the clutch pedal from its pressed position may be speeded up and its movement during the actual engagement of the clutch be regulated accurately at that speed at which no grabbing or undesirable slipping will occur.

A still further object is to provide a conveniently located supplemental attachment or switch for quickly and easily terminating the automatic operation of the clutch such that the vehicle may be operated with or without automatic clutching at will.

A still further object is to provide an electromagnetically operated valve for use alternatively in a device of the nature described and to provide also a fluid pressure switch in the electric circuit thereof adapted to prevent the flow of current through the electromagnet except when the motor is running. With this provision, if the operator of the vehicle stops the motor but accidentally leaves the ignition on, the current through the magnet will be cut off and its destruction prevented.

In the operation of prior devices of the described nature, the motor speed is often increased considerably before the clutch is completely engaged, thus causing unnecessary wear on the clutch. Accordingly, yet another object of the invention is to prevent this increasing of motor speed when the clutch is not completely engaged.

In the accompanying drawing forming part of this specification, the present invention is illustrated somewhat in detail, but it is to be understood that the invention is not limited to the specific structure shown, but covers all modifications coming within the scope of the appended claims.

In said drawing:

Figure 1 is a somewhat diagrammatic elevation with parts shown in section of the preferred embodiment of the complete device together with a small portion of the body of the vehicle, in particular, the floor and dash boards;

Figures 2 and 3 are enlarged detail sections of the preferred control valves, illustrating the two portions of the rotary cylinder, taken on lines 2—2 of Fig. 4;

Figure 4 is a cross section with parts in elevation of the valve shown in Figs. 2 and 3.

Figure 5 is a sectional view of an alternative disk and sleeve type valve; and

Figure 6 is a sectional view of a further alternative disk type valve which is electrically operated, showing also an automatically operated switch connected through the throttle stop and adjustment lever, a fluid pressure operated safety switch, and a cut off switch for mounting on the dash or floor board of the vehicle.

Referring to Fig. 1 more in detail, there is mounted beneath or in front of the floor boards 10 a servo-motor 11 having a piston 12 connected to the clutch arm 13 through bracket 14 and link 15, preferably, a flexible cable.

The servo-motor 11 is connected through conduit 16 to the valve 17. A conduit 18 from said valve leads to the intake manifold of the motor. Said valve is preferably mounted on floor board 10a. Leading from said valve is a flexible cable 19 connected to the accelerator rod 20 in such manner that the opening of the throttle by depressing the button 21 operates valve 17. In the accelerator rod 20, a lost motion connection is provided, comprising a slot and pin link 22 as illustrated. Said rod 20 connects with the carburetor control lever 23 in the usual manner. A button 41 is provided on the dash board 42 of the vehicle and is connected to the valve 17 by a wire or rod 43 by which the flow of air through the valve 17 may be cut off or on as desired, as will be hereinafter explained.

With reference to Figs. 2 and 3, showing the valve 17 in section, a casing 24 is shown having inlet and outlet ports 25 and 26. In the casing there is a rotatable cylinder 27 having a passage 28 and a branch passage 28a preferably of smaller diameter than passage 28. The casing 24 has an additional opening 29 in which is inserted a breather valve 30 provided with an opening 31 controlled by an adjustable screw 32 and an extended portion 33 having an opening 34, a second opening 35 controlled by an adjustable screw 36 and a small piston 37 held by tension spring 38 normally in the position shown in Fig. 2. Within the extended portion of the valve is a stop 39 adapted to arrest the movement of piston 37 when the same is moved in an upward direction.

The valve 17 is also preferably provided with a cut off rotary valve 40 connected through lever 40a to rod 43 to button 41 on the dash, such that the vehicle may be operated with or without automatic clutching at will. It is not necessary that the cut off valve be an integral part of valve 17, for the same may be entirely separate.

Fig. 2 illustrates the position of the cylinder 27 when the valve is open to the suction from the manifold, and Fig. 3 when it is closed to said suction but open to the atmosphere through breather valve 30.

In Fig. 4 the rotatable cylinder is shown to have an axial projection 44, said projection having a radial projection 45. A pulley 46 is rotatably or loosely mounted on projection 44 and is provided with a pin 47 adapted when rotated in one direction only to contact with projection 45. A spring 48 is connected between pulley 46 and the casing 24 in such manner as to cause the pulley to rotate in a direction to wind up the flexible cable 19 attached thereto.

A second spring 49, weaker than spring 48, is provided and is connected between the casing 24 and the projection 45, tending to hold the cylinder 27 in the position shown in Fig. 3. In operation, when the pulley 46 is rotated by tension on the cable 19, the spring 49 holds the valve in the position disclosed in Fig. 3. When the tension on cable 19 is released, the pulley 46 is rotated in the opposite direction by the spring 48. During said rotation the pin 47 contacts with the projection 45 and rotates cylinder 27 against the action of the weaker spring 49 into the position shown in Fig. 2. Suitable stops 47' are provided for preventing the cylinder 27 from moving beyond the two positions, the projection 44 having an arm 49' secured thereto which contacts said stops.

In Fig. 5, illustrating a disk and sleeve type valve, a piston 50 terminating in a disk 51 controls the flow of air between conduits 16 and 18 leading to the servo-motor and intake manifold, respectively. A spring 52 tends to maintain the disk 51 in a closed position as illustrated. The disk 51 and its stem are centrally perforated for a short distance in from the face of the disk, and this perforation connects with a lateral bore 53 which opens into a passage in the casing which is adapted to be connected to a breather valve identical with that shown at 30 in Figures 2 and 3. Thus, when the disk 51 is against the valve seat, conduit 16 is connected to the breather as in the first embodiment, but when the valve disk 51 is lifted from its seat, the breather is shut off and the full suction from the manifold is exerted on the piston 12 of the servo-motor. When pressure is removed from the accelerator, the accelerator spring (not shown) causes rod 20 and the rigid connecting rod 19a to force the lever 54 supported by a projection 55 from the position shown in dotted lines in the direction of that shown in solid lines, whereby the piston 50 and the disk 51 are caused to move in a direction to open conduit 16 to conduit 18, and close off breather openings 53.

With reference to Fig. 6, the piston 56 is controlled by an electromagnet 57 and a spring 58 tending to hold the disk 59 in the closed position shown. The electric circuit in which the magnet is connected includes a switch situated at the throttle control, one contact point 60 of the switch being situated on but insulated from the throttle stop 61 and the other being situated on the throttle adjustment means 62. In operation, when the throttle is open this valve remains closed. When the throttle is closed, the electric circuit is complete and the electromagnet being energized causes the piston to open the valve and to close off the passage to the breather valve 30.

The electric circuit is preferably connected through a switch 63 placed either on the dash board or on the foot board of the vehicle. If situated on the dash, the switch is preferably of the ordinary push and pull variety. If situated on the floor board, it may be of the single button, push on and push off type. If desired, a switch may be provided in both places, in which case the floor switch may be of a spring type in which the circuit remains closed except while the button is in its depressed position. This floor switch is placed in a position convenient to the left foot of the operator of the vehicle. The provision of a switch of this latter nature permits the driver of the vehicle to expeditiously prevent disengagement of the clutch when it is desired to use the motor as a brake simultaneously with the foot operated brake. When the vehicle comes almost to a stop, a removal of the foot from the switch will permit the clutch to automatically become disengaged.

The electric circuit is optionally provided with a fluid pressure operated switch 64 having a piston 65 which when under suction is adapted to effect contact through the plate 66 and terminals 67 and 68. A spring 69 breaks contact when there is no suction on the piston 65. This switch prevents the burning out of the electromagnet if the ignition switch or current is left on after the motor is stopped, for the same is connected directly in the suction line 18 leading to the manifold. This switch may be made an integral part of the electrically operated control valve if so desired.

The breather valve 30 operates in the following manner: When the cylinder 27 rotates to the position shown in Fig. 3, suction due to retraction of the piston 12 in the servo-motor 11, transmitted through the conduit 16, branch passage 28a, passage 28, and opening 29 of the valve 17, causes air to enter through the openings 31 and 34 of the breather valve 30. The quantity of air admitted through the two openings is comparatively large and thus permits the piston 12 to rise rapidly and the clutch arm 13 also to move rapidly toward its engaged position.

The continued suction in the breather valve 30 causes the piston 37 to move upwardly into a position opposite the opening 34 whereby the admission of air through the same is terminated. The quantity of air admitted to the breather valve and servo-motor is thus reduced with the result that the speed with which the clutch arm 13 moves into its engaging position is substantially reduced. The screw 32 permits accurate regulation of the quantity of air admitted and hence the speed with which the clutch becomes engaged. The screw 36 permits regulation of the time during which the passage 34 remains open and hence regulates the position of the clutch arm when the reduction in its speed toward engagement occurs.

The unique construction of breather valve 30 accordingly permits any speed of clutch arm movement throughout its engaging movement. Thus the breather valve can be regulated to suit the clutch on any make of motor vehicle and with the result that the clutch will be automatically and quickly engaged without grabbing or excessive slipping.

It is to be understood that the instant invention is not limited to the use of fluid pressure from the manifold as the source of power for operating the servo-motor 11. The pump may, for instance, be operated by fluid pressure from a compressed air tank, such as is used on vehicles equipped with air brakes. The necessary changes in construction and arrangement of the various elements of the described device necessary when compressed air is employed, are obvious to anyone skilled in the art.

Substantially all makes of motor vehicles may be equipped with the apparatus attachments of the present invention without changing the position of any of its parts. The attachments may be constructed at a low cost, many of their parts being obtainable from stock.

Having thus described the invention, what is claimed as new and desired to be secured by Letters Patent is:

1. Power operated clutch control mechanism comprising, in combination with a clutch to be operated and a source of vacuum power, a pressure differential operated motor operably connected to the clutch, a valve for controlling the clutch disengaging and engaging operations of said motor, electrical means for operating said valve to effect a disengagement of the clutch, foot operated means for rendering said electrical means inoperative, and means automatically operative, when the vacuum power source becomes inoperative, to render said electrical means inoperative.

2. In an automotive vehicle provided with a clutch operating member, a pressure differential operated motor operably connected to said member, valve means operable to initiate the clutch disengaging and engaging operations of the motor, and other valve means for so controlling the clutch engaging operation of the motor as to effect two distinct stages of movement of the clutch operating member as the clutch moves into engagement, said latter valve means including a pressure differential operated valve member automatically operable when it has moved a certain distance to terminate the first stage of clutch engaging movement of said clutch operating member, said latter valve means further including means for determining the rate of movement of said pressure differential operated valve member and accordingly determining the rate of movement of the clutch operating member during its first stage of movement.

3. A valve structure for use in a fluid pressure conduit connected to a servo-motor adapted to automatically operate the clutch of a motor vehicle comprising a valve casing provided with a cylindrical interior and having inlet and outlet ports and a port connected with a breather valve, a rotatable cylinder in said casing, a main passage through said cylinder, a branch passage associated therewith, an axial projection extending from one side of said cylinder, a spring tending to rotate said cylinder in the direction of its closed position, a pulley rotatably mounted on said projection, a second spring stronger than said first-mentioned spring tending to rotate said pulley in an opposite direction, and means connected with said pulley whereby the tension of said second spring may be transmitted to said cylinder to rotate the same into its open position.

OTIS J. HAWKS.